(12) United States Patent
Galvin et al.

(10) Patent No.: US 11,471,895 B2
(45) Date of Patent: Oct. 18, 2022

(54) METHOD OF PREPARING A WATER IN OIL EMULSION

(71) Applicant: The University of Newcastle, Callaghan (AU)

(72) Inventors: Kevin Patrick Galvin, Callaghan (AU); Kim van Netten, Callaghan (AU)

(73) Assignee: The University of Newcastle, Callaghan (AU)

( * ) Notice: Subject to any disclaimer, the term of this patent is extended or adjusted under 35 U.S.C. 154(b) by 822 days.

(21) Appl. No.: 16/323,621

(22) PCT Filed: Aug. 4, 2017

(86) PCT No.: PCT/AU2017/050824
§ 371 (c)(1),
(2) Date: Feb. 6, 2019

(87) PCT Pub. No.: WO2018/027260
PCT Pub. Date: Feb. 15, 2018

(65) Prior Publication Data
US 2019/0201915 A1 Jul. 4, 2019

(30) Foreign Application Priority Data
Aug. 8, 2016 (AU) ................................. 2016903103

(51) Int. Cl.
*B03D 3/06* (2006.01)
*C09K 23/00* (2022.01)

(52) U.S. Cl.
CPC ................. *B03D 3/06* (2013.01); *C09K 23/00* (2022.01); *C09K 23/017* (2022.01); *B03D 2201/002* (2013.01); *B03D 2203/02* (2013.01)

(58) Field of Classification Search
CPC ................ B03D 3/06; B03D 2201/002; B03D 2201/02; B01F 17/00; B01F 17/0085;
(Continued)

(56) References Cited

U.S. PATENT DOCUMENTS 4,734,206 A * 3/1988 Clayfield .................. B03B 1/04
 44/574
6,261,463 B1 * 7/2001 Jacob .................... C09K 23/017
 516/65
(Continued)

FOREIGN PATENT DOCUMENTS

DE 3724890 A1 * 2/1989
FR 2944458 A1 * 10/2010 ............. A61K 8/062

OTHER PUBLICATIONS

Kim van Netten, Roberto Moreno-Atanasio, and Kevin O. Glavin, 2014. Fine Particle Beneficiation through selective Agglomeration with an Emulsion Binder. p. 15747-15754 (Year: 2014).*
(Continued)

*Primary Examiner* — Gene O Crawford
*Assistant Examiner* — Muhammad Awais
(74) *Attorney, Agent, or Firm* — Marshall, Gerstein & Borun LLP

(57) ABSTRACT

A method of preparing a water in oil emulsion comprises forming a mixture of oil and emulsifying agent, progressively adding an aqueous salt solution to the mixture and dispersing the aqueous salt solution into the mixture. A concentrated water in oil emulsion is formed with drops of the aqueous salt solution (1) packed inside the oil solution phase (2). The emulsion is added to water and then mixed so that the emulsion absorbs the water. The salt concentration of the emulsion relative to the salt concentration of the water is controlled. Methods of agglomerating fine hydrophobic particles in a slurry using the water in oil emulsion are provided, where the emulsion is added to the slurry and then mixed so that the emulsion absorbs the water in the slurry. The salt concentration of the emulsion relative to the salt concentration of the slurry is controlled.

29 Claims, 1 Drawing Sheet

(58) Field of Classification Search
CPC ............ B01F 17/0007; B01F 2001/002; B01F 223/05; C09K 23/00; C09K 23/017; C09K 23/002
USPC ............................................................. 209/5
See application file for complete search history.

(56) References Cited

U.S. PATENT DOCUMENTS

| | | | |
|---|---|---|---|
| 2007/0173599 A1* | 7/2007 | Liu ................. | C09K 23/54 524/588 |
| 2013/0102688 A1* | 4/2013 | Murata ............. | A61K 8/8152 514/772.4 |
| 2013/0104772 A1* | 5/2013 | Schabron .......... | C09K 23/003 208/45 |
| 2014/0360094 A1* | 12/2014 | Galvin ............. | C10L 5/22 44/551 |
| 2016/0152797 A1 | 6/2016 | Rediger | |
| 2018/0155650 A1 | 6/2018 | Galvin et al. | |

OTHER PUBLICATIONS

Kim van Netten, Roberto Moreno-Atanasio, and Kevin O. Glavin, 2016. Selective Agglomeration of Fine coal using a water-in-oil emulsion. p. 54-61 (Year: 2016).*
Van Netten et al., "*Enhanced recovery of fine coal particles using a modified oil agglomeration process*", Australian Particle Technology Society Student Conference, Sep. 27-29, 2013, 2 pages.
Van Netten, "*Preparation of Coal Agglomerates Using a Water-in-Oil Emulsion*", Chemeca Conference, Sep. 29, 2013, pp. 332-336.
Van Netten et al., "*Avoiding waste: a case study on fast agglomeration of fine coal using a novel and economic binder*", PCMIA/SME Annual Joint Meeting, Oct. 22, 2014, 1 page.
Van Netten, "*A kinetic study of a modified fine coal agglomeration process*", Procedia Engineering 102 (2015) pp. 508-516, Jan. 1, 2015.
Van Netten, "*Fast and Selective Fine Coal Agglomeration Using an Economic Binder*", 6th Australian Coal Preparation Society Conference, Mar. 13, 2016, 11 pages.
Galvin et al., "*Ultra-fast recovery of hydrophobic particles using a novel hydrophobic binder medium*", IMPC 2016: XXVIII International Mineral Processing Congress Proceedings, Sep. 11, 2016, 10 pages.
Borrow et al., "*Agglomeration of Non-Hydrophobic Particles using a Hydrophobic Binder*", Paper 3384670, Chemeca Conference 2016, Sep. 25-28, 2016, pp. 581-586.
Galvin et al., "*A new method for ultra-fast concentration of hydrophobic particles*", Chemical Engineering Science 158 (2017), pp. 439-444, Oct. 31, 2016.
Van Netten,"*Fast Agglomeration of Ultrafine Hydrophobic Particles Using a High-Internal-Phase Emulsion Binder Comprising Permeable Hydrophobic Films*", Industrial & Engineering Chemistry Research 56 (2066), pp. 10658-10666, Sep. 5, 2017.
Van Netten et al., "Fine Particle Beneficiation Through Selective Agglomeration with an Emulsion Binder," Ind. Eng. Chem. Res. 53, 2014, pp. 15747-15754.
Van Netten et al., "Selective Agglomeration of Fine Coal Using a Water-in-Oil Emulsion," Chemical Engineering Research and Design, vol. 110, 2016, pp. 54-61.
Aronson et al., "Highly Concentrated Water-in-Oil Emulsion: Influence of Electrolyte on Their Properties and Stability," Journal of Colloid and Interface Science, 159, 1993, pp. 134-149.
Search Report in International Application No. PCT/AU2017/050824 dated Oct. 31, 2017, 3 pages.
European Patent Office, European Search Report for Application No. 17838207.3, dated Mar. 4, 2020.
Koroleva, M Y and Yurtov, E V, 'Effect of Ionic Strength of Dispersed Phase on Ostwald Ripening in Water-in-Oil Emulsions', Colloid Journal, vol. 65, No. 1, pp. 40-43 (2003).
Hunter et al., 'Effect of Salt on the Formation and Stability of Water-in-Oil, Pickering Nanoemulsions Stabilized by Diblock Copolymer Nanoparticles', (2020) American Chemical Society, Langmuir, 36, 15523-15535.
Jiao et al., 'Ostwald ripening of water-in-hydrocarbon emulsions', Journal of Colloid and Interface Science, 264, (2003) pp. 509-516.

* cited by examiner

METHOD OF PREPARING A WATER IN OIL EMULSION

FIELD OF THE INVENTION

The invention relates to a method of preparing a water in oil emulsion and in particular to a method of agglomerating fine hydrophobic particles in a slurry. The invention has been developed primarily for use as in the separation of mineral ore particles and will be described hereinafter by reference to this application.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

There is great interest in achieving efficient and selective recovery and concentration of ultrafine hydrophobic particles, typically below 100 microns. Moreover, it has been very difficult to recover and concentrate such particles below 10 microns, and much more difficult when the particles are finer than 1 micron. In the mining industry, the traditional method used to recover hydrophobic mineral particles has been based on froth flotation.

Alternative conventional technologies have included oil agglomeration, where pure oil was used to agglomerate the fine hydrophobic mineral particles. In this process, the pure oil phase consisted of miscible combinations of oil. However, the quantity of oil required to agglomerate a given quantity of coal, for example, was very significant when pure oil was used as the binder, rendering the process uneconomic for application to the mining industry.

Recently, the inventors developed unique methods of recovering and concentrating hydrophobic particles using a concentrated water in oil emulsion. The concentrated water in oil emulsion typically consisted of an aqueous phase which is dispersed as small droplets within a continuous oil phase. The oil phase contains an emulsifier that delivers stability to the oil-water interface, preventing the coalescence of the tightly packed water droplets. The emulsion acts as a hydrophobic medium. If the emulsion is broken into fragments, or stretched under shear, the external surface of the emulsion remains hydrophobic. Therefore, a significant volume of hydrophobic emulsion material is thus created using a small quantity of oil. In particular, the internal surface area formed by the oil phase becomes very large due to the thin liquid films of the oil.

It had previously been demonstrated that fine hydrophobic coal can be agglomerated using this concentrated water in oil emulsion as a hydrophobic binder. This resulted in substantial reductions in oil consumption, making the agglomeration process using the concentrated water in oil emulsion economic, achieving significant coal recovery, and minimal contamination of the product by low value minerals.

In the concentrated water in oil emulsion, the volume fraction of the aqueous water phase is greater than about 0.7 and is ideally as high as 0.95, or higher if that can be achieved. There is very significant interest in increasing the volume fraction beyond 0.95 to increase the effectiveness of the emulsion binder. The benefit of a high volume fraction is that a larger volume of concentrated water in oil emulsion can be formed while only requiring a relatively small amount of oil. However, normal methods of preparation struggle to produce emulsion binders with this higher volume fraction.

It is an object of the present invention to overcome or substantially ameliorate one or more of the disadvantages of prior art, or at least to provide a useful alternative. It is an object of the invention in at least one preferred form to provide an improved method of preparing the water in oil emulsion. It is an object of the invention in at least one other preferred form to provide an improved method of agglomerating fine hydrophobic particles in a slurry using a water in oil emulsion.

SUMMARY OF THE INVENTION

According to a first aspect of the invention, there is provided a method of preparing a water in oil emulsion, comprising:
 forming a mixture of oil and emulsifying agent;
 progressively adding an aqueous salt solution to said mixture and dispersing said aqueous salt solution into said mixture, thereby forming a concentrated water in oil emulsion with drops of said aqueous salt solution packed inside the oil solution phase;
 adding said emulsion to water;
 mixing said water and said emulsion so that said emulsion absorbs said water; and
 controlling the salt concentration of said emulsion relative to the salt concentration of said water.

In some embodiments, the salt concentration of said aqueous salt solution in said emulsion is greater than the salt concentration of said water. In other embodiments, the salt concentration of the aqueous salt solution in the emulsion is less than the salt concentration of the water.

In some embodiments, said emulsion forms into smaller portions as a result of mixing said water and said emulsion.

In some embodiments, the salt concentration of said water is substantially zero. In other embodiments, the salt concentration of said water is below 10 wt %. Preferably, the salt concentration of said water is below 3 wt %. In one preferred form, the salt concentration of said water is below 1 wt %.

In some embodiments, the salt concentration of said aqueous salt solution in said emulsion is below 10 wt %. In other embodiments, the salt concentration of said aqueous salt solution in said emulsion is below 3 wt %. In one preferred form, the salt concentration of said aqueous salt solution in said emulsion is below 1 wt %.

According to a second aspect of the invention, there is provided a concentrated water in oil emulsion made according to the method of the first aspect of the invention.

According to a third aspect of the invention, there is provided a method of agglomerating fine hydrophobic particles in a slurry, comprising:
 forming a mixture of oil and emulsifying agent;
 progressively adding an aqueous salt solution to said mixture and dispersing said aqueous salt solution into said mixture, thereby forming a concentrated water in oil emulsion with drops of said aqueous salt solution packed inside the oil solution phase;
 adding said emulsion to said slurry;
 mixing said emulsion and said slurry so that said emulsion absorbs water in said slurry;
 causing said fine hydrophobic particles to collide and stick to the emulsion binder particles; and controlling the salt concentration of said aqueous salt solution in said emulsion relative to the salt concentration of said slurry.

According to a fourth aspect of the invention, there is provided a method of agglomerating fine hydrophobic particles in a slurry, comprising:

forming a mixture of oil and emulsifying agent;

progressively adding an aqueous salt solution to said mixture and dispersing said aqueous salt solution into said mixture, thereby forming a concentrated water in oil emulsion with drops of said aqueous salt solution packed inside the oil solution phase;

adding said emulsion to water;

mixing said water and said emulsion so that said emulsion absorbs said water to form a binder solution;

adding said binder solution to said slurry;

causing said fine hydrophobic particles to collide and stick to the emulsion binder particles in said binder solution; and controlling the salt concentration of said aqueous salt solution in said emulsion relative to the salt concentration of said slurry.

In some embodiments, the salt concentration of said aqueous salt solution in said emulsion is greater than the salt concentration of said slurry. In other embodiments, the salt concentration of said aqueous salt solution in said emulsion is less than the salt concentration of said slurry.

In some embodiments, the salt concentration of said slurry is substantially zero. In other embodiments, the salt concentration of said slurry is below 10 wt %. Preferably, the salt concentration of said slurry is below 3 wt %. In one preferred form, the salt concentration of said slurry is below 1 wt %.

The methods of the third and fourth aspects of the invention may have the preferred features of the first aspect of the invention stated above, where applicable.

In some embodiments, said aqueous salt solution comprises NaCl. However, in other embodiments, the aqueous salt solution comprises one or more other mineral salts, ionic liquids, an acidic solution or an alkali solution.

Preferably, said hydrophobic particles have a diameter of up to 2 mm. More preferably, said hydrophobic particles have a diameter of up to 500 µm (0.5 mm). In some embodiments, said hydrophobic particles have a diameter of up to 300 µm (0.3 mm). In other embodiments, said hydrophobic particles have a diameter of up to 100 µm (0.1 mm) In further embodiments, said hydrophobic particles have a diameter of up to 45 µm (0.045 mm). In yet another embodiment, said hydrophobic particles have a diameter of up to 10 µm (0.010 mm). In a further embodiment, the hydrophobic particles have a diameter of up to 1 µm (0.001 mm).

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
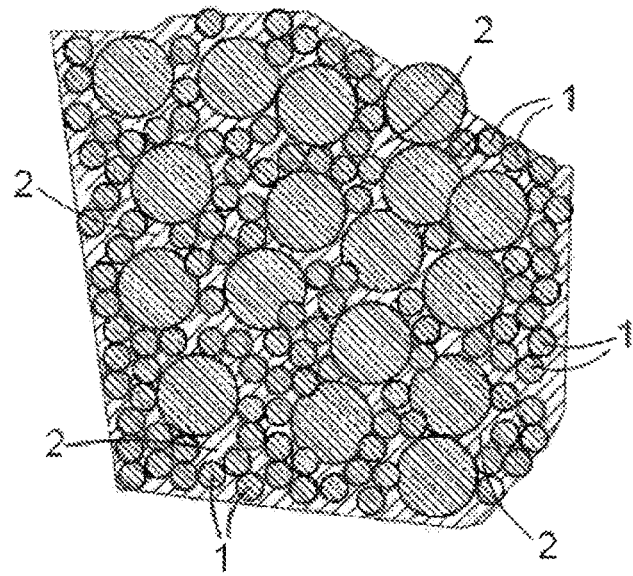
FIG. 1 is a diagrammatic representation of a concentrated water in oil emulsion according to one embodiment of the invention.

The present invention will now be described with reference to the following examples which should be considered in all respects as illustrative and non-restrictive. In the Figures, corresponding features within the same embodiment or common to different embodiments have been given the same reference numerals.

In an embodiment of the invention, a concentrated water in oil emulsion prepared by firstly forming a mixture of pure oil, such as diesel or kerosene, with an appropriate emulsifying agent, such as sorbiton mono oleate (SMO). This initial mixing forms a miscible oil phase. In examples made in accordance with this embodiment, typically the mixture comprises 50 wt % kerosene and 50 wt % SMO.

Next, salt (NaCl) was added to some water to form an aqueous salt solution, preferably comprising 3 wt % salt. However, other salt concentrations are suitable, such as 1 wt % while in other cases much higher concentrations such as 10 wt % are appropriate. The aqueous salt solution is added to the oil mixture, preferably so that the volume of the aqueous salt solution added is less than the volume of the mixture. A hand mixer or other mixing device is used to disperse the aqueous salt solution into the oil mixture. Once dispersed, more of the aqueous salt solution is added, again making sure that the volume of the aqueous salt solution added is less than the volume of the gradually forming emulsion. Hence, at any given time, the aqueous salt solution is much less than the oil mixture or the emulsion that is present. This process of addition of the aqueous salt solution continues until the required level of aqueous phase has been reached.

As best shown in FIG. 1, once the process is complete the aqueous salt solution is dispersed into the oil phase forming tiny drops of salt water 1, tightly packed inside the oil phase 2. This concentrated water in oil emulsion appears homogenous, having the appearance of "white goo". In addition, the emulsion binder is very viscous.

The emulsion so formed always presents an oil like interface to the added aqueous salt solution, and hence the salt water continues to disperse into the emulsion. While a typical concentrated packing fraction of equal sized spheres is 0.64 to 0.75, the aqueous volume fraction in a concentrated water in oil emulsion can increase to 0.9 or even 0.95. The salt water drops develop a size distribution and deformation that permits this very tight fraction as illustrated in FIG. 1.

The emulsion is now added to water (or vice versa) and mixed in so that the emulsion binder absorbs the water. The concentration of any salt in this water is carefully controlled so that it is preferably less than the salt concentration of the emulsion binder. The mixing is continued until the white opaque emulsion binder is dispersed and broken into smaller binder portions suspended in the water.

The stability of the emulsion binder is improved by using an aqueous salt solution to form the droplets inside the emulsion. Stability in this context is defined in terms of the resistance to Ostwald Ripening, as opposed to a failure of the oil water interface to contain the aqueous salt water phase in its discrete form. Due to the Laplace pressure associated with the curvature of the small drops, there is a tendency for relatively small drops to become even smaller by allowing their water to pass through the oil films and into the larger drops, which may be referred to as "coarsening". However, if the water drops contain salt, the tendency to lose water is greatly reduced because a loss of water raises the salt concentration further, thus opposing a loss of water. If the salt concentration is raised, then osmosis of water through the thin oil film will drive more water back into the drops. Thus, the addition of salt delivers stability in the drop size.

In contrast, the absence of salt results in permeation of the water, driving the water out of the relatively small drops and into the relatively large drops, due to the higher excess Laplace pressure in the smaller drops. Therefore, the presence of an aqueous salt solution within the water drops reduces or eliminates the tendency for water to permeate out of the drops. When the emulsion binder is placed into pure water, the water permeates across the oil film and into the drops containing the aqueous salt solution. This effect can be further improved by breaking the binder into fragments or smaller binder portions through applying a shear force or placing the binder and water in a shear field. This results in the water permeating more easily into the binder.

In applying the embodiment of the invention to the field of mineral processing, the water can now be considered as a slurry having hydrophilic and hydrophobic particles suspended in the pure water. At the nanoscale, the permeation of the water in the slurry produces an outward movement of the thin film of oil, with little overall volume change. From the perspective of the hydrophobic particles, the oil film appears to move towards the hydrophobic particles. The hydrophobic particles are thus effectively entrained by the water that permeates through the oil film even though it is the film that is moving. Substantial distances are involved, arguably beyond that of the long-range hydrophobic force (less than 100 nm). As the solids are insoluble, the hydrophobic particles will tend to adhere to the oil, while the hydrophilic particles fail to interact with the oil in the emulsion. Consequently, the hydrophilic particles ultimately diffuse away producing a layer of hydrophilic particles near the oil film of the emulsion binder. The adhesion of the hydrophobic particles produces additional stability of the thin oil film of the binder, helping to preserve the binder under these extreme conditions. In one view, the emulsion binder effectively acts like a vacuum cleaner, drawing local water and particles towards the oil film. This mechanism helps explain the remarkable performance of the emulsion binder, where particle deposition is clearly independent of the particle size.

Figure 2:
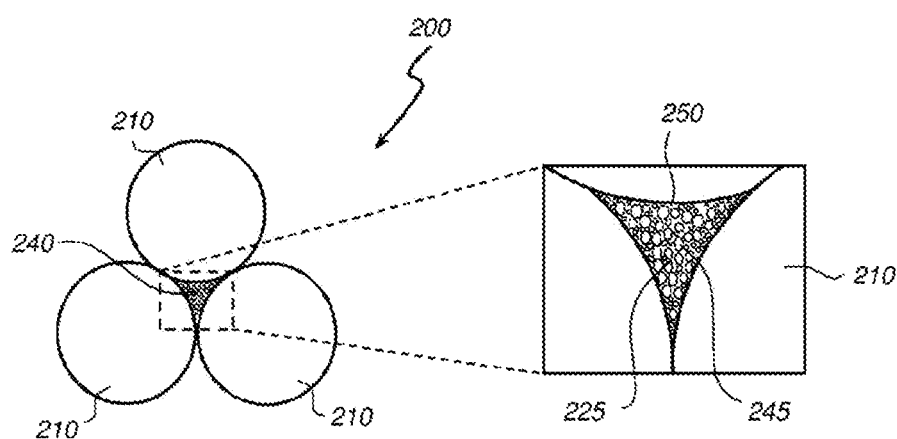
FIG. 2 is a diagrammatic representation of an agglomeration of hydrophobic particles using the emulsion of FIG. 1.

Thus, the solid particles collide and stick to the tiny emulsion goo particles. Because of the significant volume of emulsion, the solid particles bind to form agglomerates, with the emulsion goo acting as a binding agent, providing the interstitial bulk between solid particles. Referring to FIG. 2, the agglomerated hydrophobic particles 200 comprise solid hydrophobic particles 210 bonded by the water in oil emulsion binder 240 that fills the interstices 225 between the solid hydrophobic particles 210. However, within the binder 240, dispersed salt water droplets 245 are stabilised by thin films of oil, the oil being present as a continuous phase. The surfaces of the hydrophobic particles 210 adhere to the oil layer 250. Thus, space-filling functionality of the emulsion binder is achieved by small salt water drops 245 within the emulsion binder 240, thus reducing the reagent consumption. The use of the water in oil emulsion binder delivers efficient conditioning of the oil over the surface of the solid hydrophobic particles 210.

In this way, it can be observed that by adding the emulsion binder with a salt concentration to an aqueous based slurry comprising hydrophobic particles like solid fine coal particles contained in a coal and mineral matter slurry, and controlling the salt concentration of the emulsion relative to the salt concentration of the water/slurry, the emulsion binder is able to be more efficient in capturing the hydrophobic particles.

Thus, due to this enhanced efficiency of the emulsion binder by controlling the difference in the salt concentration between the internal drops within the binder and the external slurry, this embodiment of the invention increases the speed of the agglomeration process and the extent to which the finest of the hydrophobic particles can be captured. For example, with fine coal, the exceedingly fine coal particles are not necessarily wanted because they consume too much of the emulsion binder, and the final product moisture tends to be higher. Hence, there are advantages in reducing the salt concentration difference in this case as this leads to a coarser hydrophobic product of lower moisture. Conversely, in some other applications there may be significant value in capturing these very fine particles, for example high value minerals and precious metals such as platinum group metals. Hence, this embodiment of this invention enables increasing the salt concentration difference to promote the recovery of these very fine particles. Thus, by controlling the salt concentration of the binder relative to the salt concentration of the slurry, the embodiment of the invention enables efficient use of the emulsion binder with greater recovery and speed.

Furthermore, it will be appreciated that the effectiveness of the emulsion binder in the slurry may be further improved by initially mixing the emulsion binder with water as described in relation to FIG. 1 above, prior to contacting the emulsion binder with the slurry. Pre-mixing the emulsion binder with water, preferably fresh or pure water having substantially zero salt, causes the emulsion binder to form fragments or smaller binder portions, allowing the emulsion binder to more quickly absorb water.

In this case, the mixing or stirring breaks the binder into fragments or smaller emulsion binder portions allowing water to contact the hydrophobic exterior of the emulsion binder fragments. These emulsion binder fragments appear to grow in volume over time. The salt within the emulsion binder draws water into the binder, increasing the drop size and in turn reducing the average thickness of the oil film around the drops. By reducing the oil film thickness from (for example) about 29 nm to 17 nm, the surface area of the thin oil films increases, meaning less oil is needed to produce a given level of product. Hence, when running the agglomeration process in continuous steady state conditions, a lower amount of the emulsion binder was required to achieve a given recovery of hydrophobic coal. The osmotic pressure provides a mechanism for increasing the volume fraction of the aqueous salt phase to levels higher than achieved by the previously described method for producing the emulsion binder.

The binder is then combined with the slurry containing hydrophobic particles and subjected to a high rate of shear. A given quantity of oil recovers more of the hydrophobic particles due to the pre-conditioning of the binder with the fresh water. Experimental results using an example in accordance with this embodiment indicate a 39% reduction in the oil required for a binder based on 3 wt % salt concentration. Other experiments have involved varying the salt concentration of the slurry containing hydrophobic and hydrophilic particles and the salt concentration of the water in the emulsion binder. When the external salt concentration matched the concentration in the drops there was relatively little osmosis and so the effectiveness of the binder and speed of separation were slower. Conversely, by increasing the salt concentration of the water used to form the drops within the binder the speed of the agglomeration process increased.

The inventors believe that the permeation flux of the water through the oil film is so high because the oil films in the emulsion binder are stabilised by the presence of emulsifiers which at one end of the molecule exhibit affinity with the oil phase while at the other end of the molecule exhibit affinity with the aqueous phase. The emulsifier, SMO, is likely to self-assemble in a variety of ways, adsorbing at the oil-water interface, forming micelles within the oil phase, and forming other structures through the oil film, connecting the external space with the interior water drops. Thus, the pressure driving force that develops across the oil film tends to oppose the water migration that is driven by the strong difference in the salt concentration. Therefore, the water will tend to permeate via the larger drops in the first instance, with subsequent permeation across the network towards the smaller drops. These structures should form more readily in the presence of a strong driving force, either via the Laplace pressure or the salt concentration difference.

In other examples, the emulsion binder prepared in accordance with the process described in relation to FIG. 1 achieved agglomeration of hydrophobic particles under batch conditions in just 7 seconds, and in as little as 3 seconds if the binder was broken up into fragments prior to the addition of the slurry. This speed is at least 10, and arguably 100 times faster than conventional oil agglomeration approaches. The emulsion binder also proved remarkably effective in recovering exceedingly fine coal as fine as 1 micron or less. The recovery, selectivity, and speed were exceptional. By comparison, froth flotation performs poorly on particles less than about 10 microns, and is kinetically slow as the particle size becomes finer.

In another example, the agglomeration process performance was ultrafast under continuous steady state conditions. A fine coal slurry was pumped through a tube, 25 mm in diameter, at about 40 L/min. The emulsion binder in accordance with the process described in relation to FIG. 1, was fragmented in a suspension with water and then introduced to the slurry using a pump. The fragmented emulsion binder and the fine coal slurry were then squeezed through a partially closed ball valve, producing a high shear rate. Agglomerates were then formed in a time period estimated to be well under 1 second. The agglomerates formed under either batch or continuous processing conditions were sufficiently resilient for separation over a screen from the remaining suspension of ultrafine hydrophilic particles.

It is also noted that there was not any selectivity based on particle size. Particles as small as 1 micron were recovered as effectively as those that were 10 microns. These findings contrasted with the performance of froth flotation which reveals poorer performance below about 10 microns, and an increasingly poor performance as the particle size decreases.

In other embodiments where the emulsion binder is subjected to intense shear, the binder breaks-up into smaller fragments, stretching with the flow, presenting more of the binder surface area to the external water. The binder fragments reconfigure their structure, combining with each other, and then forming new fragments. All of these processes lead to new and additional surfaces being presented to the external water. The dynamic stresses within the system support the binder morphology that evolves, including the internal drop curvatures, potentially reducing the excess pressure arising from the interfacial curvature. Reductions in the pressure difference across the interface should lead to more water permeation into the drops. These circumstances lead to increased deposition rates of the hydrophobic particles at the surface of the oil films, throughout the binder.

Thus, the benefits of the embodiments of the invention may be summarised as follows:

The effectiveness of the emulsion binder is improved by initially preparing the binder using an aqueous salt solution, mixing the binder with external water (or water at a low salt concentration compared to that in the binder) to form fragments of the binder, allowing the binder to absorb water. Here the external water has either no salt or a salt concentration below that of the level within the binder. The absorption of water by the binder causes the drop volume to expand resulting in a further thinning of the oil films, increasing the surface area of the oil films.

By controlling the difference in the salt concentration between the internal drops within the binder and that of the external slurry the speed of the process increases and there is an improvement in the extent to which the finest particles can be captured. The hydrophobic particles entrain with the water that permeates through the oil films. Thus the osmosis produces a very long range action resulting in the adhesion of the hydrophobic particles at the surface of the oil film.

Increasing the difference in the salt concentration between the internal drops within the binder and that of the external slurry increases the speed of the process.

Increasing the difference in the salt concentration between the internal drops within the binder and that of the external slurry reduces the quantity of oil required.

Increasing the difference in the salt concentration between the internal drops within the binder and that of the external slurry improves the effectiveness of the particle recovery below 10 microns.

In further embodiments, inverting the emulsion binder following the agglomeration process, and following the capture of the agglomerates over a screen, permits filtering of the solids and recovery of the salt solution, allowing the salt to be recycled. This process will also allow the technology to be exploited more effectively through the use of much higher salt concentrations without compromising the quality of the product. In addition, a final washing of the filter cake with fresh water may be used to remove any remaining salt from the product.

It will be appreciated that although the examples given here have involved the application of the salt, NaCl, the invention can be applied with respect to almost any salt, and can be applied by using different mineral salts. Other suitable alternatives include ionic liquids, acidic solutions or alkali solutions. Salts can also be chosen on the basis of the final application of the hydrophobic particles recovered. Salts that offer environmental benefit, including fertilizer, may be preferred if the solids are to be incorporated back into the land.

Although the embodiments of the invention have been described with reference to the agglomeration of fine coal particles, it will be appreciated that it can be applied to the agglomeration of other particles, such as mineral particles, liquid particles, particles of organic matter, organic molecules, or any combination thereof. In the case of liquid particles, they may be in the form of drops, micro-drops or droplets (i.e. drops with an average diameter of less than 500 µm). For example, the invention can be readily applied to the agglomeration of oil micro-drops and droplets, where the goal is to clean up or purify contaminated water by removing these micro drops and droplets.

In another example, the water in oil emulsion binder may be used in a solvent extraction process. Here, the emulsion binder captures dissolved species in the solvent, aided by osmosis. In this application of the invention it is believed that the concentrated water in oil emulsion binder improves solvent extraction through increased process speed. The emulsion binders can be mixed in a water based slurry containing particles and molecules of interest and optionally subjected to an intense shear rate. The strong permeation by osmosis delivers the molecules of interest into the aqueous salt phase drops of the emulsion. The emulsion binder can be recovered over a screen. The binder can then be inverted and filtration used to recover the molecules of interest.

Although the invention has been described with reference to specific examples, it will be appreciated by those skilled in the art that the invention may be embodied in many other forms.

The invention claimed is:

1. A method of preparing a water in oil emulsion for agglomerating fine hydrophobic particles, comprising:
    forming a mixture of oil and emulsifying agent;
    progressively adding an aqueous salt solution to said mixture and dispersing said aqueous salt solution into said mixture, thereby forming a concentrated water in oil emulsion with drops of said aqueous salt solution packed inside the oil solution phase;
    adding said emulsion to water;
    mixing said emulsion and said water to break the emulsion into smaller portions, each smaller portion having said aqueous salt solution surrounded by an oil film; and
    controlling the salt concentration of said emulsion relative to the salt concentration of said water;
    wherein the salt concentration of said aqueous salt solution in said emulsion is greater than the salt concentration of said water such that the water is drawn into the smaller portions thereby increasing a size of the smaller portions, reducing a thickness of the oil film, and increasing a surface area of the oil film thereby improving interaction of the emulsion with the fine hydrophobic particles during agglomeration.

2. The method of claim 1, wherein the salt concentration of said aqueous salt solution in said emulsion is below 10 wt %.

3. The method of claim 1, wherein the salt concentration of said water is substantially zero.

4. The method of claim 1, wherein the salt concentration of said water is below 10 wt %.

5. The method of claim 1, wherein said aqueous salt solution comprises NaCl, a mineral salt, ionic liquids, an acidic solution or an alkali solution.

6. A concentrated water in oil emulsion made according to claim 1.

7. A method of agglomerating fine hydrophobic particles in an aqueous slurry, comprising:
    forming a mixture of oil and emulsifying agent;
    progressively adding an aqueous salt solution to said mixture and dispersing said aqueous salt solution into said mixture, thereby forming a concentrated water in oil emulsion with drops of said aqueous salt solution packed inside the oil solution phase;
    adding said emulsion to said slurry;
    mixing said emulsion and said slurry to break the emulsion into smaller portions, each smaller portion having said aqueous salt solution surrounded by an oil film;
    causing said fine hydrophobic particles to collide and stick to the emulsion; and
    controlling the salt concentration of said aqueous salt solution in said emulsion relative to the salt concentration of said slurry such that the salt concentration of said aqueous salt solution in said emulsion is greater than the salt concentration of said slurry such that water present in the slurry is drawn into the smaller portions thereby increasing a size of the smaller portions, reducing a thickness of the oil film and increasing a surface area of the oil film thereby improving interaction of the emulsion with the fine hydrophobic particles during agglomeration.

8. A method of agglomerating fine hydrophobic particles in a slurry, comprising:
    forming a mixture of oil and emulsifying agent;
    progressively adding an aqueous salt solution to said mixture and dispersing said aqueous salt solution into said mixture, thereby forming a concentrated water in oil emulsion with drops of said aqueous salt solution packed inside the oil solution phase; and
    adding said emulsion to water;
    mixing said emulsion and said water so that said emulsion absorbs said water to form a binder solution;
    adding said binder solution to said slurry;
    causing said fine hydrophobic particles to collide and stick to emulsion binder particles in said binder solution; and
    controlling the salt concentration of said emulsion relative to the salt concentration of said slurry such that the salt concentration of said aqueous salt solution in said emulsion is greater than the salt concentration of said slurry.

9. The method of claim 7, wherein the salt concentration of aqueous salt solution in said emulsion is below 10 wt %.

10. The method of claim 7, wherein the salt concentration of said slurry is below 10 wt %.

11. The method of claim 7, wherein the salt concentration of said emulsion is greater than the salt concentration of said water.

12. The method of claim 11, wherein the salt concentration of said water is below 10 wt %.

13. The method of claim 8, wherein the salt concentration of aqueous salt solution in said emulsion is below 10 wt %.

14. The method of claim 8, wherein the salt concentration of said emulsion is greater than the salt concentration of said water.

15. The method of claim 11, wherein the salt concentration of said water is below 10 wt %.

16. The method of claim 1, wherein the salt concentration of said aqueous salt solution in said emulsion is below 3 wt %.

17. The method of claim 1, wherein the salt concentration of said aqueous salt solution in said emulsion is below 1 wt %.

18. The method of claim 1, wherein the salt concentration of said water is below 3 wt %.

19. The method of claim 1, wherein the salt concentration of said water is below 1 wt %.

20. The method of claim 7, wherein the salt concentration of aqueous salt solution in said emulsion is below 3 wt %.

21. The method of claim 7, wherein the salt concentration of aqueous salt solution in said emulsion is below 1 wt %.

22. The method of claim 7, wherein the salt concentration of said slurry is below 3 wt %.

23. The method of claim 7, wherein the salt concentration of said slurry is below 1 wt %.

24. The method of claim 8, wherein the salt concentration of aqueous salt solution in said emulsion is below 3 wt %.

25. The method of claim 8, wherein the salt concentration of aqueous salt solution in said emulsion is below 1 wt %.

26. The method of claim 11, wherein the salt concentration of said water is below 3 wt %.

27. The method of claim 11, wherein the salt concentration of said water is below 1 wt %.

28. The method of claim 11, wherein the salt concentration of said water is below 3 wt %.

29. The method of claim 11, wherein the salt concentration of said water is below 1 wt %.

* * * * *